E. DE N. ANDERSON.
MACHINE FOR APPLYING LININGS TO HOLLOW ARTICLES.
APPLICATION FILED JUNE 1, 1907.

1,089,618.

Patented Mar. 10, 1914.
7 SHEETS—SHEET 1.

Witnesses:

Inventor
Ernest DeNeen Anderson
by C. H. Williams
Attorney

E. DE N. ANDERSON.
MACHINE FOR APPLYING LININGS TO HOLLOW ARTICLES.
APPLICATION FILED JUNE 1, 1907.

1,089,618.

Patented Mar. 10, 1914.

Witnesses:

Inventor
Ernest De Neen Anderson
by C. H. Williams
Attorney

E. DE N. ANDERSON.
MACHINE FOR APPLYING LININGS TO HOLLOW ARTICLES.
APPLICATION FILED JUNE 1, 1907.

1,089,618.

Patented Mar. 10, 1914.

Witnesses:

Inventor

Attorney

E. DE N. ANDERSON.
MACHINE FOR APPLYING LININGS TO HOLLOW ARTICLES.
APPLICATION FILED JUNE 1, 1907.

1,089,618.

Patented Mar. 10, 1914.

Witnesses:

Inventor

Attorney

E.- DE N. ANDERSON.
MACHINE FOR APPLYING LININGS TO HOLLOW ARTICLES.
APPLICATION FILED JUNE 1, 1907.

1,089,618.

Patented Mar. 10, 1914.

Witnesses:

Inventor

UNITED STATES PATENT OFFICE.

ERNEST DE NEEN ANDERSON, OF NEW YORK, N. Y., ASSIGNOR TO UNION PAPER COMPANY, OF NEW YORK, N. Y., A CORPORATION OF NEW YORK.

MACHINE FOR APPLYING LININGS TO HOLLOW ARTICLES.

1,089,618. Specification of Letters Patent. Patented Mar. 10, 1914.

Application filed June 1, 1907. Serial No. 376,885.

*To all whom it may concern:*

Be it known that I, ERNEST DE NEEN ANDERSON, a citizen of the United States, residing in the borough of Manhattan, city, county, and State of New York, have invented a Machine for Applying Linings to Hollow Articles, of which the following is a specification.

The object I have in view is the production of a machine for applying linings of any character to hollow articles of any character.

Among the various objects I have in view is the production of a machine for applying cushioned linings to boxes or cartons which are used for holding and transporting phonograph blanks and phonograph records. These boxes or cartons are customarily made of pasteboard. The lining therein is usually made of a combination of pasteboard upon one side and canton flannel on the other, the base of the flannel being glued to the board. These linings are cut to a rectangular form and are of such a size that when bent to a cylindrical shape they may be inserted within the carton and will extend throughout the greater portion of the depth of the latter. A small amount of adhesive material introduced between the inside of the carton and the lining will secure the latter in place.

While my invention is particularly designed for the production of a machine of the type referred to above, it is not so limited, as it may be used for a machine for an analogous or different purpose.

By my invention I seek to reduce the expense of introducing linings and to make the work more uniform than has heretofore been the case.

In the drawings one embodiment of my invention is illustrated, which consists of a machine for applying the linings to cartons for containing phonograph records.

In the drawings, Fig. 1ª is a detail view of an adjustable stop for a lining. Fig. 2 is a side view of the same but with the reservoir for adhesive material removed. Fig. 2ª is a detail elevation of a portion of the machine taken from the side opposite that shown in Fig. 2. Fig. 3 is a section on the line $a$—$a$ of Fig. 1, and showing the operation of the mechanism for applying adhesive material. Figs. 3ª, 3ᵇ and 3ᶜ are details of the stripping-off mechanism.

In all the views like parts are designated by the same reference characters.

*General considerations.*—The machine illustrated comprises means for applying glue or other adhesive material to the inside of the cartons, and mechanism for introducing the cartons into a ring or alining collar, which will grasp the open end of the carton and hold it in position so that the formed lining may be introduced within it. The linings are arranged face, or flannel side, downward in a vertical pile within a frame so that they are successively removed, one at a time, from the bottom of the pile by mechanism which subsequently curves the same around a plunger so that they assume a cylindrical form of such diameter that they may be longitudinally introduced within a carton by means of the plunger, the said carton having previously had adhesive material applied to a portion of its interior so that the lining will be permanently retained in position. Mechanism is provided for introducing the lining into the carton and to insure its introduction even if there is a tendency for the lining to stick within the alining collar. After the lining is introduced within the carton and the plunger removed, the finished carton is ejected and a fresh one previously glued is introduced in its place, and the sequence of operations is repeated.

The invention includes the use of linings the blanks for which are cut into the proper size during the operation of the machine from a long sheet of material, as well as the use of those that are previously prepared and piled in position to be singly taken by the machine and shaped properly to perform their necessary function.

The invention also comprehends various kinds of mechanisms for shaping the lining into cylindrical or tubular form and for removing the lined article from the mechanical devices which manipulate it, and various modifications in the mechanism for introducing the articles and removing them from the machine. Such modifications in the construction will hereinafter be more or less fully described.

Figure 4:
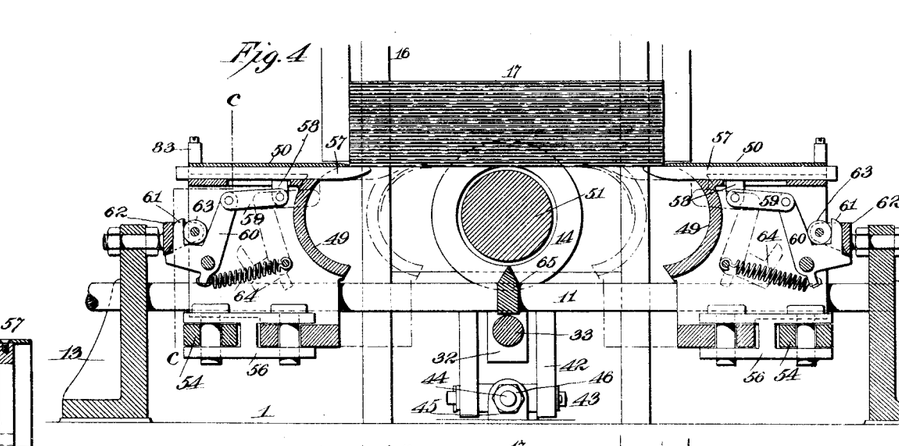
Fig. 4 is a section on the line $b$—$b$ of Fig. 1, showing the forming dies in their outermost position.
Figure 5:
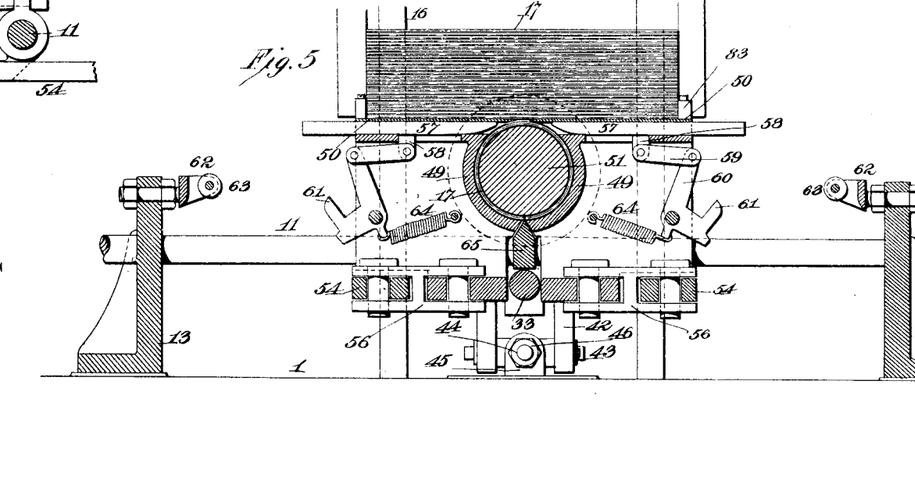
Fig. 5 is a similar view but showing the dies in their innermost position and a lining curved to the cylindrical shape which it assumes when introduced within the carton.

*The frame and driving mechanism.*—All of the mechanism is supported upon a platform or table 1, which is supported upon legs 2—2 at a height convenient to the operator. The main driving shaft 3 is mounted in bearings below the table 1 and is rotated by a pulley 4, through the agency of the usual belt and other mechanism (not shown). The shaft 3 carries a spur pinion 5, which engages with a spur gear 6, carried by the shaft 7. This shaft 7 will be referred to hereafter as the main shaft. The main shaft is supported by suitable bearings above the table 1. The rotation of the main shaft actuates all the mechanism except certain mechanism which will be afterward described, in connection with the adhesive material reservoir. All of the mechanism, with the exception of the shaft 3, is supported upon the top of the table 1. The cartons or boxes 8, which are shown as cylindrical in shape, are supported in a chute 9, which chute is attached to one side of the table 1 and extends beyond the table a sufficient distance to permit enough cartons to be carried in the machine to suit the convenience of the operator. The chute 9 is inclined, as shown, and is provided with side walls 9ᵃ—9ᵇ see Fig. 3. The distance between these walls is slightly greater than the length of the carton, so that the latter may freely roll down the chute. The reservoir 10 for adhesive material is carried by two rods 11—11, which extend across the top of the table from one side to the other. The adhesive material reservoir is secured to the rods 11 by a set screw 12, so that it may be removed and more readily cleaned and filled. The rods 11—11 are supported above the table by means of brackets 13—13, shown best in Figs. 4 and 5. The alining collar 14 is supported between the cross pieces 15—15, which cross pieces are carried by the frame 16. This frame 16 (see Fig. 2) extends upward a considerable distance and is for the purpose of supporting the linings 17. A second chute 18 is for the purpose of guiding the lined cartons away from the machine and into a receptacle (not shown).

Figure 1:
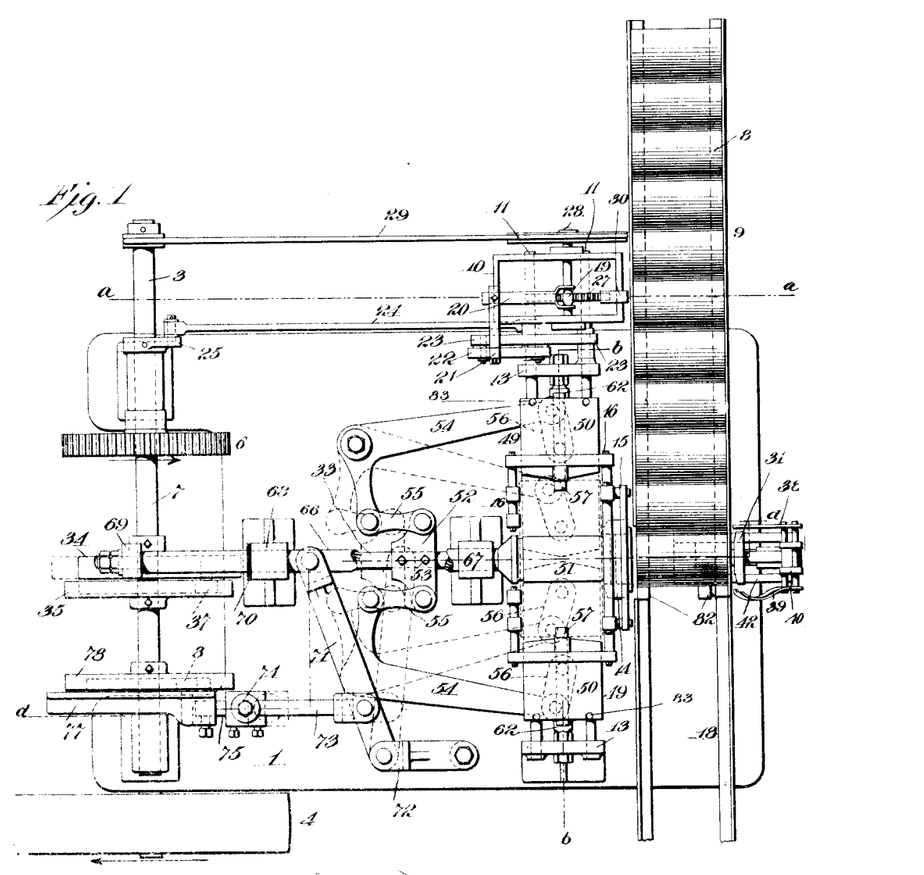
Figure 1 is a plan view of the machine.
Figures 2, 2A, 3, 3A, 3B, 3C:
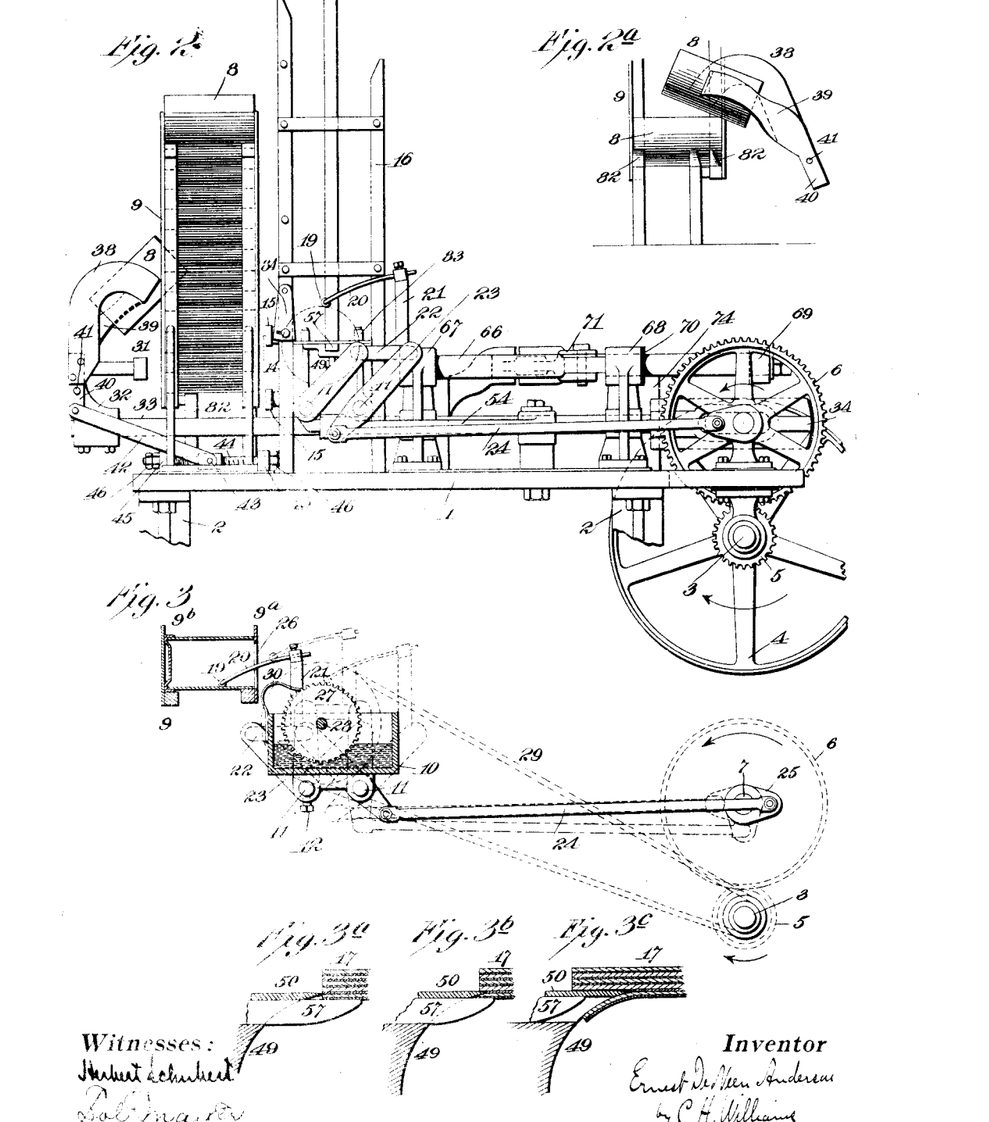

*The applying mechanism for the adhesive material.*—This is best shown in Fig. 3. The reservoir 10 is to one side and slightly below the chute 9. The adhesive material is applied to the inside of the carton from the reservoir 10 by means of a roller 19, carried by a spring finger 20. This spring finger is carried upon a vertical standard 21, which in turn is supported upon a horizontal piece 22. This horizontal piece is supported upon the links 23—23, which turn in bearings upon the rods 11—11. One of the links has a depending portion which is connected to a rod 24, the other end of the rod being connected to a crank 25 on the main shaft 7. Upon the shaft 7 being rotated, the links 23 will be oscillated, moving the spring finger 20 and the roller 19 into and out of the carton. The finger passes through a slot or opening 26 formed in the side wall 9ᵃ. The location of this slot or opening is determined by the diameter of the carton employed. The carton, which is at the bottom of the chute and which is receiving the lining blank, is fixed in position during such time. This forms a stop or abutment to prevent the descent of the other cartons in the chute. The slot 26 should, therefore, be so located that the roller 19 will pass through the exact center of the carton, which at that moment is opposite to the slot, as shown in Fig. 1. This is the fifth carton above the one which is receiving the lining blank. The proportion and size of the parts is specified solely for the purpose of clearness of illustration. The roller 19 is adapted to come in contact during one portion of its movement with a wheel 27, mounted on a shaft 28, on the reservoir 10. The wheel dips down into the adhesive material and takes up a sufficient quantity for the purpose. This shaft is rotated by the belt and pulley mechanism 29 from the driving shaft 3. A spring finger 30 in engagement with the wheel removes the excess of adhesive taken up by the wheel. The links 23, with the vertical standard 21 and horizontal piece 22, constitute a parallel movement, so that the vertical standard 21 always remains vertical and the movement of the roller 19 is always in the path of a circle. This structure permits the utilization of the rods 11—11 for bearings for the moving support of the spring finger 20, and also allows of a compact and satisfactory arrangement of moving parts. Mounting the roller upon a spring finger it will engage with elastic pressure with the bottom of the inside wall of a carton, and deposit the adhesive throughout the extent desired in the latter.

Figure 8:
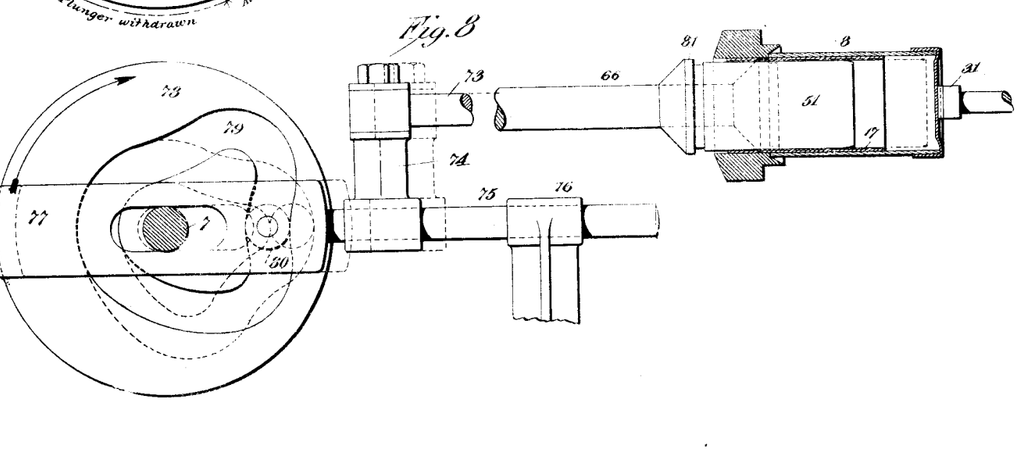
Fig. 8 is a similar view showing the plunger and lining inserted within the carton.
Figure 9:
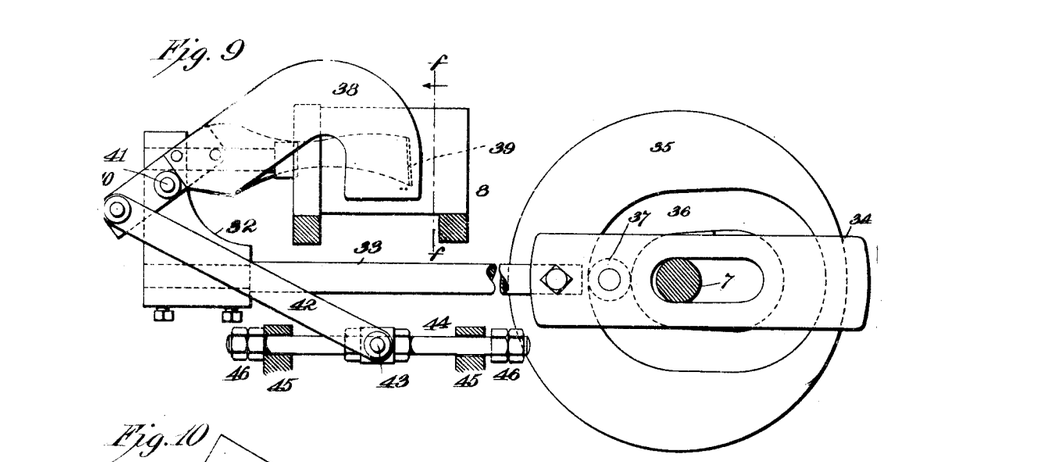
Fig. 9 is a detail view of the mechanism for removing the finished carton from the machine.
Figure 10:
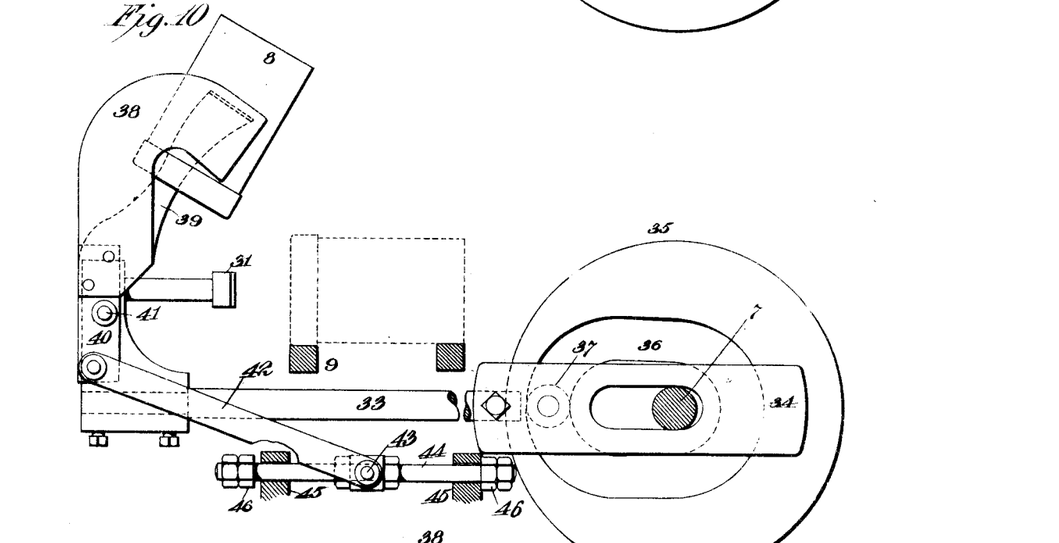
Fig. 10 is a similar view showing the parts in a different position.
Figure 11:
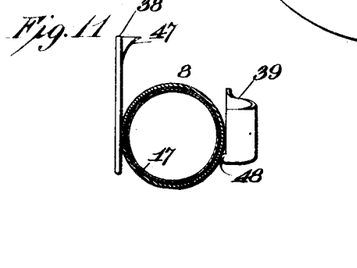
Fig. 11 is a section on the line $f$—$f$ of Fig. 9.

*The carton placing and removing mechanism.*—The cartons descend the chute 9 and are successively brought into position to have the linings inserted. The mechanism for accomplishing this is best shown in Figs. 9, 10 and 11. The carton is engaged by a moving buffer 31, which pushes it into the alining collar 14. (See Figs. 7 and 8). This moving buffer is supported upon a carriage 32, which is carried by a rod 33, such rod extending under the frame 16; the other end of the rod is connected to a Scotch yoke 34, the central opening of which surrounds the main shaft 7. The latter shaft carries a disk 35 having a cam groove 36 in one face. A pin carrying a roller 37 on the Scotch yoke engages with the cam groove 36. The shaft opening in the Scotch yoke is of the width of the shaft 7, so that the yoke is supported by engagement with the shaft. Upon rotation of the shaft 7, the rod 33 will be reciprocated, as is apparent, engaging the moving buffer 31 with a carton, and pushing the latter into the alining collar 14.

After the cartons have been lined they are removed by mechanism which includes the fingers 38 and 39. These fingers are carried upon a pivoted frame 40, pivoted at 41, to the carriage 32. Below the pivot the frame is connected by links 42 to a fulcrum 43. This fulcrum is in the form of a pin supported upon a rod 44. The rod 44 is mounted in bearings 45—45 on the table 1. It is free to move within the bearings, its extent of movement being limited by the nuts 46 so that a small amount of longitudinal movement will be secured. The finger 38 is considerably wider than the finger 39, and carries a cam or block 47 on the face toward the finger 39. The finger 39 is bent outward away from the finger 38, and then inward, so that its end and not its side will engage with the carton. Its lower corner is formed into a pin or projection 48, which will engage within the relatively soft walls of the carton and assist in lifting the lined carton. It will be apparent that as the rod 33 is reciprocated, carrying the carriage 32 with it, the fulcrum 43 being practically stationary, with but only a slight and limited movement, the frame 40 will turn upon its pivot 41. As a lined carton is lifted by the fingers 38 and 39, another carton will take its place on the chute. As the rod 33 is moved in the other direction to engage the buffer 31 with the new carton and force it into the alining collar, the finished carton will be brought down upon that carton, being held within the fingers 38 and 39, and solely by the elastic contact of the latter with it; the fingers continuing their movement will move beyond this carton. When the cam or block 47 comes in contact with the top of the carton, it will move it to one side over the spring finger 39 and into the discharging chute 18.

Figure 12:
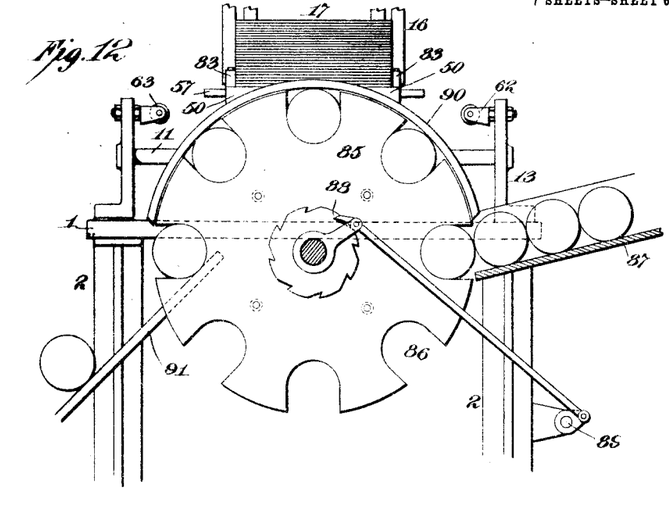
Fig. 12 is a rear view of a portion of the machine showing a modification of the means for feeding the cartons.
Figure 13:
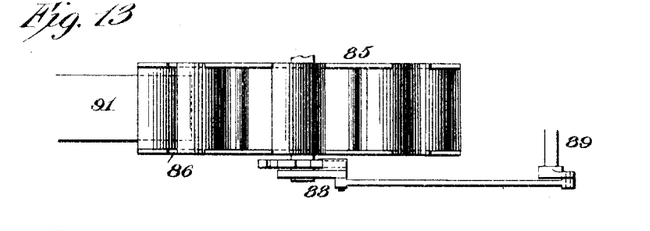
Fig. 13 is a plan view of the same but with the shield removed.

A modification of the carton introducing and removing mechanisms is illustrated in Figs. 12 and 13. In these views a star wheel 85 is employed, such star wheel consisting of two plates as shown in Fig. 13, with peripheral notches 86, such notches being of a suitable size and shape to contain and support the cartons. The cartons descend the chute 87, after having previously had adhesive applied to their interior, and successively enter the notches. The star wheel is intermittently rotated by suitable mechanism as by means of the pawl and ratchet mechanism 88, which is actuated by the continuously rotated shaft 89. A guard or shield 90 incloses the notches 86 and holds the cartons in position in the star wheel. While the cartons are supported in this star wheel the linings are formed and introduced within them. The cartons may be ejected in any manner as by means of the chute 91, which is interposed within the path of the cartons at a place beyond the end of the shield 90.

Figure 6:
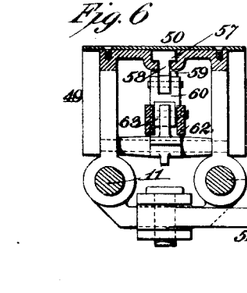
Fig. 6 is a detail section on the line $c$—$c$ of Fig. 4.

*The stripping off and lining-forming mechanism.*—As already described, the linings 17 are piled within the frame 16. These linings in the embodiment illustrated consist of rectangular pieces of cardboard or pasteboard, with a layer of canton flannel pasted to one side, with the nap-side outward. These linings are piled within the frame 16, with the flannel sides downward. The sides of the frame 16 are composed of rods, as shown, which engage with the sides and ends of the pile of linings. The linings are supported at the bottom by the tops of the moving forming dies 49, except as will be hereinafter pointed out. As shown in Fig. 6, each die is arranged to slide upon the rods 11 so that they may approach toward and away from each other. The dies are hollow, the opposing walls being curved to the shape of a portion of a cylinder. The tops of the dies are in the form of plates 50. The opposing edges of these plates are sharpened to a sharp edge and come to a point, when viewed from the top, as shown in Fig. 1. This construction is made so that they will readily separate the lower lining from the one immediately above it.

Means is provided for reciprocating the dies so that they will approach each other and bend or curl up a lining between the curved faces of the dies and around the form, mandrel, or plunger 51. This means is actuated by the rod 33 and cam disk 35. Reference being had to Fig. 1, it will be seen that a yoke 52 is attached to the rod 33 so as to be moved by the latter. The attachment of the yoke is made by means of set screws 53, so that the position of the yoke may be adjusted for wear or to accommodate different sizes or thickness of linings, or sizes of cartons. The movement of the yoke transmits movement to bell cranks 54 through the agency of links 55. At the other extremities of the bell cranks are links 56 which are connected to the forming dies 49. One arm of each bell crank is much longer than the other, so that the movement of the rod 33 is magnified, and the dies are moved a proportionately greater distance. The dies when separated to the maximum extent produce an opening sufficiently large for the linings to drop through. To limit the number and restrict it to the lowest one, I provide the following mechanism: This consists of the fingers 57, which are carried by each of the forming dies 49. These fingers slide within ways immediately under the covering plates 50, and each is adapted to extend toward the other die a sufficient distance to provide a bearing for the pile of linings. The fingers are a distance below the top of the cover plate, equal to the thickness of a lining. (See Figs. 3ª, 3ᵇ, 3ᶜ). The parts are so arranged that as the forming dies separate to let the linings drop down, the fingers 57 will be extended so as to produce a support for the linings, to permit the latter to descend a sufficient distance so that as the plates are moved toward each other, the sharpened and pointed edges of the cover plates will be inserted between the top of the lower lining and the bottom of the one above it. The canton flannel being relatively yielding and soft will permit this sharpened edge of the cover plate 50 to enter between the lowermost lining and the one next above it without danger of deranging the pile of linings or injuring any one of them or otherwise causing trouble. As the forming dies continue to move, the fingers 57 are adapted to be quickly withdrawn. This occurs just as soon as the advancing edges of the plates 50 are entered between the linings, and have provided a support for the pile of linings. The edges of the lowermost lining will then be free to follow down the curved inner face of the forming die and be bent around the plunger. In order to withdraw the fingers 57, each is provided with a depending piece 58, which is connected through the agency of a link 59 to a bell crank 60, the latter being pivoted to the forming die. The other extremity of the bell crank is provided with a finger or trigger 61, which is adapted to enter a loop 62, which is carried or supported upon the bracket 13. The outer portion of the loop is provided with a roller 63 to reduce friction, and the upper end of the finger or trigger 61 is beveled as shown. A spring 64 normally retracts the finger 57 unless prevented by engagement of the finger 61 with the loop 62. The engagement of the finger with the roller 63, when the dies are moved toward each other, insures the quick, positive and certain withdrawal of the fingers 57. Below the plunger 51, and supported upon the rods 11, is an aliner 65 with a sharpened upper edge. This aliner is for the purpose of engaging with the edges of the lining as the latter is bent around the plunger and will correct any inequalities or incorrect positioning of the lining when it is bent within the dies.

Figure 7:
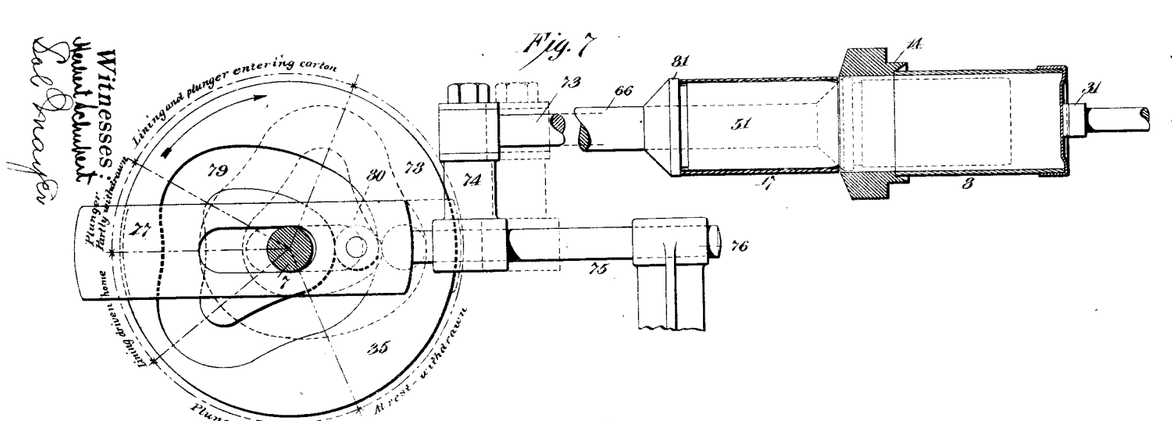
Fig. 7 is a detail section on the line $d$—$d$ of Fig. 1, showing the plunger retracted while the other mechanism is in the same position as shown in Fig. 5.

*The lining-inserting mechanism.*—After the lining is bent around the form, mandrel, or plunger 51 it is inserted endwise or telescopically by the latter into the carton. The mechanism for accomplishing this is best shown in Figs. 7 and 8. The plunger 51 is supported upon a rod 66, which rod slides in bearings 67—68. The free end of the rod is provided with an adjustable buffer 69, which is adapted to engage with the bearing 68 and limit the extent of movement of the plunger. An elastic washer 70 may be interposed between the bearing 68 and the buffer so as to reduce shock when the buffer comes in contact with the bearing. The bearings 67 and 68 also serve as a convenient support for the rod 33. The rod 66 is reciprocated by means of a lever 71 which is pivoted to a support 72, the latter being carried by the table 1. Between the fulcrum of the lever 71 and its connection with the rod 66 is a rod or pitman 73. This rod or pitman 73 is connected to a vertical standard 74, which is carried by a rod 75, below the level of the rod 73. This rod 75 slides within a bearing 76. Its other end is connected to a Scotch yoke 77, the opening of which yoke surrounds the shaft 7, the yoke being supported thereby but free to be moved in a horizontal direction thereon. On the shaft 7 is a disk 78, which is provided with a cam groove 79. Within this cam groove a roller 80, carried by the Scotch yoke, engages, and by means of this engagement of the roller with the groove, the yoke, and with it the plunger 51 are reciprocated. The cam groove 79 is gibbous in shape, so that an irregular movement will be imparted to the plunger. The functions of the groove will be described in connection with the detailed operation of the apparatus, but at this time it is sufficient to say that the cam groove will reciprocate the plunger, so that the flange 81 on the plunger will engage with that lining which has been rolled upon the plunger and will force the latter through the alining collar 14 and telescope it into the carton. Upon the plunger being withdrawn the lining will be left in place and the carton will be retracted and ejected.

*The operation.*—The machine is started by introducing the unlined cartons into the chute 9 so that they will freely descend and be engaged by the placing and removing mechanism. Suitable adhesive material is introduced within the reservoir 10 and a pile or packet of linings, with the canton flannel sides down, is introduced within the frame 16. Care should be taken that enough linings are always within the frame so that their weight will engage the lowermost one upon the top of the forming dies; power being applied to the shaft 3 and the latter rotated in the direction of the arrows (shown in Fig. 2), the sequence of operation will begin. The location of the crank 25 is such that the spring finger 20 and roller 19 will be introduced into and withdrawn from a carton while the latter is stationary. The rod 33, which actuates the mechanism for introducing the lining and ejecting the carton after the lining has been inserted therein and also moves the forming dies, is returned at such a time that the lower-most carton will first be introduced into the alining collar by means of the moving buffer 31, at the time the forming dies have separated the lower-most lining from the packet and wrapped it around the plunger 51. At this time the plunger 51 will be in the outer or retracted position, as shown in Fig. 7. This is when the cam groove 79 is turning through the circular portion of its length, or the period of movement indicated in Fig. 7 by the words "at rest withdrawn." During this period of movement of the disk 78, the cam 36 will be moving the Scotch yoke 34, so that the forming dies will be moved together and the lining curved or bent around the plunger. The roller 80 now entering that portion of the groove 79, designated in Fig. 7 by the words "lining and plunger entering carton" will move the plunger, and with it the lining, the latter being engaged by the flange 81 through the alining collar 14 and into the carton as shown in dotted lines (Fig. 7). The groove 79 may be so formed that the lining will be introduced all of the way into the carton. I find in practice, however, that there is a tendency of the lining to stick within the collar 14, if it is pushed in with a single movement. I therefore prefer to have mechanism to withdraw the plunger a short distance after it has been introduced a considerable distance into the carton, so that if the lining has had any tendency to stick within the alining collar 14 so that it will wrinkle or permit the flange 81 to get inside of the edge, the withdrawal of the plunger, as shown in Fig. 8, will free the flange from the lining, and the plunger being introduced again will completely seat the lining within the carton without danger of the parts sticking. This partial withdrawal of the plunger is caused by the roller 80 engaging with part of the groove within the limits of the part designated by the words "plunger partly withdrawn" (in Fig. 7). The disk 78 continuing its rotation will again push the plunger into the carton, the movement being caused by the roller 80 engaging with that portion of the cam groove designated by the words "lining driven home." This will entirely seat the lining within the carton as shown in dotted lines in Fig. 8. The shape of the cam groove is such that at the innermost position of the plunger the buffer 69 will come in contact with the elastic washer 70, thereby insuring the lining being placed flush with the open end of the carton.

It is to be noted that the lining need not extend the full depth of the carton, as it is the custom to make such linings extend only so far as the record appears upon the phonograph blank. The plunger is withdrawn by the engagement of the roller 80 with that portion of the cam groove indicated by the words "plunger withdrawn" in Fig. 7. At this time the roller 37 is engaging with the concentric or circular portion of the cam groove 36, consequently the fingers 38 and 39 are in their lower-most position and are in contact with that carton which is being operated upon. The roller 37 will now begin to engage with that portion of the cam groove which becomes eccentric, moving the rod 33. The fulcrum 43 of the links 42 being mounted upon the rods 44 will move a sufficient distance to permit the arms 38—39 to disengage the open end of the carton from contact with the alining collar. The limit of movement of the rod 44 being reached, the links 42 will fulcrum upon them, swinging the fingers 38—39 and pivoting the frame 40 and lifting the finished carton from the chute. The next carton in the chute will descend by gravity and will abut against the fixed fingers 82, where it will be held in position; the lined carton now being lowered will engage with the carton below it, releasing it from engagement with the finger 38, and in order to discharge it, it is ejected over the finger 39 by the engagement of the cam 47 with the upper surface of the carton.

Figure 1A:
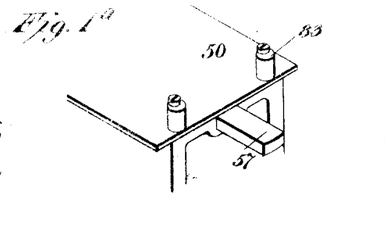

In order to employ linings of different lengths, the adjustable stops 83 (see Fig. 1ª) on the forming dies may be employed. These stops are eccentrically mounted on their supporting screws. To adjust for different widths the adjustable stops 84 carried by the frame 16 (Fig. 2) may be used. These stops are in the form of pivoted plates, a screw entering a slot, serving to firmly hold them in position.

Figure 14:
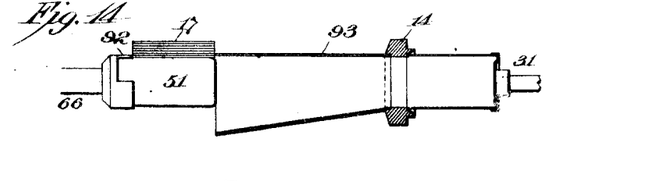
Fig. 14 is a sectional view of a modification of means for forming the linings.
Figures 15, 16:
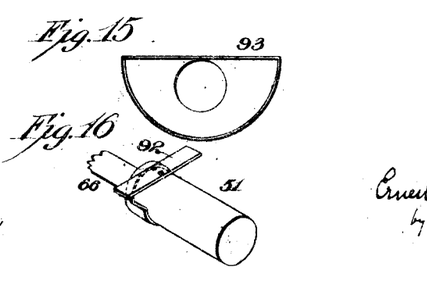
Fig. 15 is an end view of the former shown in Fig. 14.
Fig. 16 is a perspective view of the plunger shown in Fig. 14.

Figs. 14, 15 and 16 show a modified apparatus for forming and introducing the linings. The pile of linings 17 above the plunger 51 is stripped off one at a time by a flexible tongue 92 (see Fig. 16) carried by the plunger 51. In lieu of the movable forming dies a single fixed die 93 is employed. This die is in form a flat top and a curved bottom at one end and circular at the other, the intermediate portion gradually tapering from one end to the other. The circular end abuts against the alining collar 14. In operation, the bottom lining is stripped from the pile 17 by means of the flexible tongue 92, and introduced within the die 93. As it is introduced it is formed to the shape of the plunger by the configuration of the die, the flexible tongue 92 will be bent to the shape of the plunger and will offer no obstruction to the entrance of the plunger into the die. In this apparatus the forming and introducing operations are carried out by the same mechanism. It is to be understood that the alining collar 14 is not essential, as the die 93 may end adjacent to the open mouth of the carton. Any mechanism may be employed for introducing and removing the cartons, examples being shown in Figs. 1 and 12.

Figure 17:
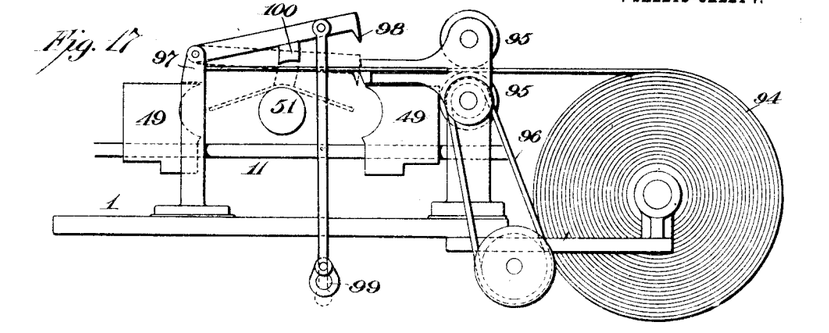
Fig. 17 is a detail view of a further modification of the means for forming the linings.

It is not essential to employ linings which have previously been cut to the required size, as the machine may be modified to use the linings in a continuous strip. One form of such machine is illustrated in Fig. 17. In this modification the lining is in the form of a roll 94; the lining is fed into the forming dies by suitable mechanism, that shown comprising the rollers 95, which frictionally engage with the lining. These rollers are driven by a slip belt mechanism 96, which permits the linings to be intermittently introduced into the machine. The forming dies 49 of the configuration already described are shown in this modification. The lining as introduced engages with a fixed abutment 97. The proper length of lining for one carton is cut off by a knife 98, which is reciprocated by mechanism from the shaft 99. This knife is shown as pivoted to the abutment 97. It carries the holding finger 100, which holds the cut lining upon the plunger 51 until it is acted upon by the forming dies. In the operation of this modification the continuous strip of lining is introduced above the forming dies by the slip belt mechanism, the end of the lining resting against the fixed abutment 97. At the proper time the knife 98 descends, cutting off the proper length of lining, and the holding finger lowers it and retains it in engagement with the plunger 51 until it is formed by the dies 49. The cut off end of the lining will engage with the end of the knife 98 until such knife is raised to the full line position shown in Fig. 97, when the slip belt mechanism will feed the end of the lining to engage the fixed abutment 97. It is apparent that this feeding mechanism may be used in connection with the mechanism illustrated in Figs. 14, 15 and 16, as well as with the mechanism illustrated.

Figure 18:
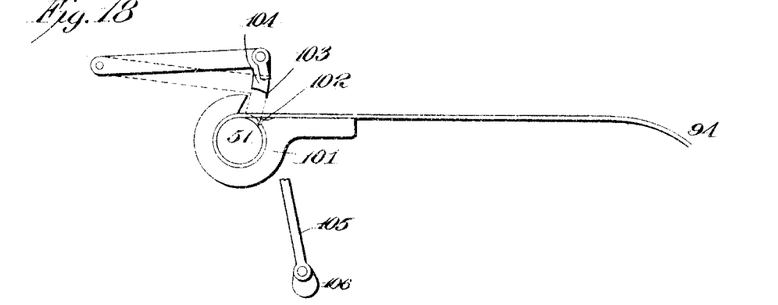
Fig. 18 is a detail view of a still further modification.

In Fig. 18, still another modification is shown, in which the linings are taken from a continuous strip. In this modification the feeding mechanism is not illustrated, but it may be the same as that shown in Fig. 17. A single forming die 101 is used, such die having a central opening of the shape of the formed lining. The lining is fed within the die and will be formed to shape as it is fed inward by engagement of the free end of the lining with the inside of the die. The lining will be continued to be fed inward into the die until its free end engages with the fixed abutment 102, whereupon the feeding mechanism will slip and no more of the lining will be fed. A knife 103 will then descend severing the formed portion of the lining from the rest. With the knife will also descend a former 104, which will tuck in the free end of the formed lining. The edge of the knife will engage with the free end of the unformed lining and prevent the further introduction of the lining into the die until the knife is raised. The knife may be reciprocated by means of a link 105, operated by a crank 106, which is rotated by means of its supporting shaft (not shown). This mechanism may be used with any form of carton introducing and ejecting mechanism.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now particularly described the nature of my invention, and in what manner the same is to be performed, what I claim and desire to secure by Letters Patent, is:

1. In a machine for lining cartons and other receptacles, the combination with means for supporting a rigid tubular object, of means for supporting a quantity of lining blanks, a sharp edged device for separating such lining blanks from each other, means for shaping a lining blank so separated into the form of a lining, and means for introducing the lining within such object.

2. In a machine for lining cartons and other receptacles, the combination with means for supporting a tubular object, of means for supporting a quantity of lining blanks, a sharp edged device for separating one lining blank from the quantity thereof, and a stop so arranged that one lining blank will pass between the edges of the separating device, means for shaping said blank into a lining, and means for introducing the lining so shaped within such object.

3. In a machine for lining cartons and the like, the combination of means for feeding the cartons to the machine, means for holding them in position to be individually operated upon, means for holding lining blanks, means for shaping said blanks into linings, including a plunger and forming dies, means for applying an adhesive material internally to the carton or other object, means for inserting the lining into said object, and means for ejecting the lined object from the machine.

4. In a machine for lining cartons and other receptacles, the combination with means for supporting the object to be lined, said means consisting essentially of a stationary collar and a movable buffer between which the object is temporarily held, of automatic mechanism for introducing a lining into the object, consisting essentially of a plunger, means for shaping the lining around said plunger, said plunger operating to deliver the lining to the object, and cam mechanism operating to actuate the plunger by introducing it partly into the object to be lined, then withdrawing it, and then again introducing it the full necessary distance.

5. In a machine for lining cartons and other receptacles, the combination with means for supporting the object to be lined, said means including a stationary collar and means for holding the object temporarily in said collar, of automatic mechanism for shaping a lining blank into proper form to serve as a lining, said automatic mechanism including a plunger, and means for introducing said plunger and the lining carried thereby through the collar into the object to be lined, with a plurality of movements, first introducing the lining part way, then withdrawing it more or less, and then introducing it the full necessary distance.

6. In a machine for lining cartons and other receptacles, the combination with means for feeding a series of cartons automatically to the machine, means for temporarily supporting in a stationary position each member of the series, said latter means consisting essentially of a stationary collar and means for holding the receptacle temporarily in said stationary collar, automatic mechanism for shaping a blank into cylindrical form, said mechanism including means for alining the meeting edges of said blank, and automatic mechanism for introducing the lining so shaped into the object to be lined.

7. In a machine for lining cartons and other receptacles, the combination with means for feeding a series of cartons automatically to the machine, means for temporarily supporting in a stationary position each member of the series, said latter means consisting essentially of a stationary collar and means for holding the receptacle temporarily in said stationary collar, automatic mechanism for shaping a blank into cylindrical form, said mechanism including forming dies and means for alining the meeting edges of said blank, and automatic mechanism for introducing the lining so shaped into the object to be lined, said latter mechanism consisting essentially of cam devices which cause the lining to partake of a variety of movements, being first inserted part way, then withdrawn, then inserted wholly into the object.

8. In a machine for lining cartons and similar receptacles, the combination with a mandrel or plunger, of a carton-feeding mechanism, means for feeding lining blanks to the mandrel or plunger, means for shaping said blanks upon the mandrel into the form of linings, means for introducing the mandrel and with a lining thereon into a carton for the purpose of lining the same, means for withdrawing the mandrel from said carton, and means for stripping the lining from the retreating mandrel.

9. In a machine for lining cartons and other similar articles, the combination with a chute down which the objects to be lined may roll, of means for arresting the movement of the objects at a certain point, means for applying linings thereto when the objects are in the arrested position, and means for applying adhesive material to the objects before they reach the lining-applying position.

10. In a machine for lining cartons and other similar receptacles, the combination with a chute down which the articles may roll, of means for arresting the movement of each at a certain point, means for applying linings to the articles when so arrested, a reservoir for adhesive material, and means for introducing adhesive material into each article before the lining is introduced.

11. In a machine for lining cartons and other similar receptacles, the combination with a chute down which the articles may roll, of an adhesive reservoir, and means for introducing adhesive material into the articles which move along the chute, said means including an elastic finger, and means for causing the finger to alternately engage with the adhesive material in the reservoir and with the inside of the article to be lined, and means for introducing a lining into the carton after the adhesive material has been applied.

12. In a machine for applying linings to tubular articles, the combination of means for supporting the articles, a reservoir for adhesive material, a spring finger, means for conveying adhesive material from the reservoir to the spring finger, and means for moving the spring finger into and out of the tubular articles, and means for introducing a lining into the carton after the adhesive material has been applied.

13. In a machine for applying linings to tubular articles, the combination of means for supporting the articles, a reservoir for adhesive material, a spring finger, means for conveying adhesive material from the reservoir to the spring finger, and means for moving the spring finger into and out of the tubular articles, said means including a parallel motion.

14. In a machine for lining cartons and other similar receptacles, the combination of a chute down which the articles roll, a reservoir for adhesive material, an elastic finger, means for conveying adhesive material from the reservoir to the elastic finger, means for moving the elastic finger into and out of the articles, and means for introducing a lining into the article after the adhesive material has been applied.

15. In a machine for lining cartons and other similar receptacles, the combination of means for supporting the articles to be lined, means for holding the lining blanks in a pile, shaping dies for the blanks, said dies assisting in supporting the linings, and means for actuating the dies so that one lining at a time will be removed from the pile and shaped into the form of a lining for the article to be lined.

16. In a machine for lining tubular cartons and the like, the combination with means for supporting the cartons, means for supporting a group of lining blanks, dies for shaping the blanks into tubular forms to serve as linings, said dies assisting in supporting the group of blanks, a plunger around which the blank is folded by the dies in making the lining, means for actuating the dies so that one lining at a time will be removed from the group, and means for actuating the plunger to insert the lining into the article to be lined.

17. In a machine for lining tubular cartons and the like, the combination with means for supporting a group of lining blanks, of forming dies, means for causing the dies to move away a sufficient distance from the lining blanks to allow the latter to drop singly between the dies, means for supporting a single lining below the upper edge of the dies, a plunger around which the dies fold the lining blank in the formation of the lining, means for actuating said plunger, and means for bringing the dies together so that each single lining blank after being detached from the pile of linings may be shaped properly to serve as a lining for the tubular article.

18. In a machine for lining tubular cartons and the like, the combination of means for supporting a group of lining blanks, of a pair of forming dies, said dies having plates at the top for assisting in supporting the group of lining blanks, the opposing edges of the plates being sharpened so as to readily enter the space between the lower-most lining and the one above it, and a plunger around which the lining blank is shaped by the action of the forming dies, means for actuating the dies, and means for actuating the plunger.

19. In a machine for lining tubular cartons and the like, the combination of means for supporting a group of lining blanks, a pair of forming dies, means for moving the dies toward and away from each other, fingers carried by the dies, which fingers engage with the lining blanks when the dies are at the outermost position, means for controlling the movement of said fingers, a plunger around which the lining blank is shaped by the action of the dies, and means for actuating the plunger.

20. In a machine for lining tubular cartons and the like, the combination of means for supporting a group of lining blanks, a pair of forming dies, means for moving the dies toward and away from each other, fingers carried by the said dies and arranged to support a lining when the dies are in their outermost position, means for controlling the movement of the dies so as to retract them at times, a plunger around which each individual lining blank after being removed from the group is shaped by the action of the dies, and means for actuating said plunger for the purpose of introducing it into the tubular carton to be lined.

21. In a machine for lining tubular articles and the like, the combination of means for supporting a group of lining blanks, a pair of forming dies, means for moving the dies toward and away from each other, moving fingers carried by said dies, bell crank levers likewise carried by the dies, connections between the bell crank levers and the fingers, fixed loops so located that they will be engaged by the bell crank levers for positively retracting the fingers upon the return movement of the dies, and a plunger around which each individual lining blank is shaped into tubular form by the action of the dies thereon.

22. In a machine for lining tubular cartons and other articles, the combination with a pair of forming dies, of means for supporting a group of lining blanks adjacent to the dies, a plunger situated between the dies around which the latter operate to shape the blank into tubular form, and an aliner interposed between the dies, said aliner being so arranged that it will insure the proper forming of the lining by the dies, means for actuating the dies and moving them toward and away from each other, and means for actuating the plunger.

23. In a machine for lining tubular cartons and other similar articles, the combination with means for supporting the articles, an alining collar engaging with an article, a plunger around which the lining is shaped, movable dies for so shaping the lining, and means for actuating the plunger for the purpose of introducing the lining through the collar and into the article.

24. In a machine for lining tubular cartons and other similar articles, the combination with a support for the articles, of an alining collar engaging with an article, a buffer likewise engaging with the article, means for lifting up the lined article and removing it from the machine, a plunger, dies movable toward and away from the plunger for the purpose of shaping a lining blank thereover, and means for actuating the plunger for the purpose of introducing the lining into the carton.

25. In a machine for applying linings to hollow articles, the combination of a main frame, a vertical frame for supporting a group of lining blanks, parallel rods above the main frame and within the lining blank frame, an alining collar, engaging with the article to be lined forming dies arranged to slide upon the parallel rods within the frame which supports the lining blanks, an aliner supported by the rods between the dies, a finger on each die for assisting in supporting the group of lining blanks when the forming dies are at their outermost position, a top plate on each of said dies likewise assisting in supporting the lining blanks, the opposing edges of said top plates being sharpened and brought to a point, a plunger, on which the lining is shaped, said plunger passing into the collar and article to be lined and means for actuating said plunger.

26. In a machine for applying linings to hollow articles, the combination of a main support, a vertical frame for holding a pile of lining blanks, parallel rods above the main support and within the frame, an alining collar, engaging the article to be lined forming dies arranged to slide upon the parallel rods within the frame which supports the lining blanks, an aliner likewise supported by the rods between the dies, a finger on each die assisting in supporting the group of lining blanks when the forming dies are at their outermost position, a top plate on each of said dies also assisting in supporting the group of lining blanks, the opposing edges of the top plates being sharpened and brought to a point.

27. In a machine for applying linings to hollow articles, the combination of a main support, a vertical frame for holding a group of lining blanks, parallel rods above the main support and within the frame, an alining collar, engaging with the article to be lined forming dies arranged to slide upon the parallel rods within the frame which supports the lining blanks, an aliner supported by the rods between the dies, a finger on each die for assisting in supporting the group of lining blanks when the forming dies are at their outermost position, a top plate on each of said dies for also assisting in supporting the lining blanks, the opposing edges of the top plates being sharpened, and a bell crank lever carried by each forming die and acting to operate the fingers, together with means for causing the forming dies to move toward and away from each other, and a plunger around which the lining blanks are shaped by means of said dies in forming the lining blank into a lining, said plunger in its operation passing through the alining collar and into the article to be lined.

28. In a machine for applying linings to articles, the combination of a main support, a vertical frame for holding a group of lining blanks, parallel rods above the main support and within the frame, an alining collar, forming dies arranged to slide upon the parallel rods within the frame which supports the lining blanks, an aliner supported by the rods between the dies, a finger on each die for assisting in supporting the group of lining blanks when the forming dies are in their outermost position, a top plate on each die which also assists in supporting the lining blanks, the opposing edges of the top plates being sharpened, bell crank levers for actuating the fingers, said bell crank levers being carried by the forming dies, connections between the bell crank levers and the fingers, fixed means on the frame, and connections between said fixed means and the bell crank levers.

29. In a machine for applying linings to articles, the combination of a main support, a vertical frame for holding a group of lining blanks, parallel rods above the main support and within the frame, an alining collar, forming dies arranged to slide upon the parallel rods within the frame which supports the lining blanks, an aliner supported by the rods between the dies, a finger on each die for assisting in supporting a group of lining blanks when the forming dies are at their outermost position, a top plate on each of said dies which also assists in supporting the lining blanks, the opposing edges of the top plates being sharpened, bell crank levers carried on each forming die for actuating the fingers, connections between the bell crank levers and the fingers, fixed loops carried by the frame, connections between said loops and the bell crank levers, a plunger adapted to move between the dies and within the alining collar, around which plunger the lining blanks are shaped by the dies into the form of linings, means for actuating the plunger, and cam devices for driving said means.

30. In a machine for lining cartons and other similar articles, the combination of means for supporting lining blanks, an alining collar which receives the articles to be lined, forming dies arranged to move toward and away from each other, each die being provided with a finger which assists in supporting the lining blanks when the dies are in their outermost position, a top plate on each of said dies also assisting in supporting the linings, the opposing edges of the top plates being thinned and sharpened, means for actuating the fingers, said means being carried by the forming dies, a plunger moving between the dies and through the alining collar, means for actuating the plunger, said latter means including cam mechanism so constructed and arranged as to cause the plunger to move partly into the alining collar and then be withdrawn and then again be pushed into it.

31. In a machine for lining cartons and other similar articles, the combination with means for supporting the cartons while being operated upon, means for supporting the lining blanks, a plunger, dies on opposite sides of the plunger arranged to move toward and away from each other and to take the lining blanks one at a time and shape them upon the plunger into the form of a lining, means for actuating said plunger including a cam mechanism whereby a forward movement is imparted first to the plunger, then a partial backward movement, and then another forward movement, the latter causing the lining to be completely inserted into the carton.

32. In a machine for lining hollow articles, the combination of means for feeding the articles and supporting them while being operated upon, means for shaping a lining blank into the form of a lining, means for introducing the lining into the hollow article, and means for removing the lined article from the machine, said latter means consisting essentially of a spring finger which engages the article and a second finger carrying a cam thereon, said two fingers acting to lift the finished article, substantially as described.

33. In a machine for lining articles, the combination with means for supporting an article while being operated upon, of means for removing the lined article from the machine, consisting essentially of mechanism including a pair of fingers, one of which is provided with a cam or block and the other of which is a bent spring having a pin engaging the article, said two fingers acting together to lift the finished article from the machine.

34. In a machine for lining hollow articles, the combination with the lining mechanism, of means for removing the lined article from the machine, consisting essentially of a movable carriage, mechanism for actuating it, a frame pivoted to said carriage, an adjustable fulcrum, links connecting said fulcrum with said frame, and a pair of fingers that engage the finished article and lift it out of the machine at the proper time.

35. In a machine for lining hollow articles, the combination with a main supporting frame, of means for feeding the articles thereto, means for applying adhesive to the inside of the articles, means for supporting a group of lining blanks, a plunger, forming dies on opposite sides thereof, means carried by said forming dies for releasing one blank at a time from the pile so that it may be caught by the forming dies and shaped upon the plunger, an alining collar, an aliner for causing the edges of the lining to meet properly, and means for removing the finished article from the machine consisting essentially of a movable carriage, a frame pivoted thereto, and fingers carried by said frame, which fingers engage the lined article at the proper time and lift it out of the way so that another article may take its place.

36. In a machine for lining hollow articles, the combination of means for supporting lining blanks, forming dies having fingers acting to remove one blank at a time from the pile, said dies being arranged to move toward and away from each other, a plunger on which the blanks are shaped, an alining collar through which the plunger operates and which receives and holds the article while being operated upon, a movable carriage having a buffer acting against one end of the article for introducing the latter into the alining collar, and mechanism for imparting to the plunger such movement as will cause the lining carried thereby to be effectively introduced into and secured within the article to be lined.

37. In a machine for lining hollow articles, the combination of means for supporting a pile of lining blanks, forming dies arranged to move toward and away from each other, each die having a finger for assisting in supporting the lining blanks when the forming dies are in their outermost position, and each of said dies having a top plate assisting in supporting the linings, the opposing edges of the top plates being sharpened, an aliner supported between the dies, a plunger likewise situated between the dies, an alining collar, means for imparting motion to the plunger, a traveling carriage, a buffer carried thereby for introducing the article to be lined into the alining collar, pivoted fingers supported by the carriage for engaging the article, a fulcrum, connections between said fulcrum and the carriage, all arranged so that the buffer may introduce an article into the collar without moving the fingers, and fingers which act to engage and lift up a lined article and permit an unlined article to take its place, after which the descending fingers will cause the lined article to engage with the unlined one and force the lined one from between the fingers.

38. In a machine for lining receptacles having one end closed and the other open, the combination of means acting against the closed end, means holding the open end, a plunger, means for shaping a lining around said plunger, and means for introducing the plunger and lining into the receptacle.

In testimony whereof, I have signed my name to this specification in the presence of two subscribing witnesses.

ERNEST DE NEEN ANDERSON.

Witnesses:
   JAMES D. WILLIAMS,
   HUBERT SCHUBERT.